United States Patent
Maynard et al.

(10) Patent No.: US 7,987,477 B2
(45) Date of Patent: *Jul. 26, 2011

(54) TECHNIQUE FOR IDENTIFYING FAVORITE PROGRAM CHANNELS FOR RECEIVING ENTERTAINMENT PROGRAMMING CONTENT OVER A COMMUNICATIONS NETWORK

(75) Inventors: Stephen L. Maynard, Arvada, CO (US); Joseph M. Hassell, Thornton, CO (US); John W. Callahan, Broomfield, CO (US); Tho T. Autruong, Boulder, CO (US); Vitaly Shoykhet, Broomfield, CO (US); Karla J. Towne, Highlands Ranch, CO (US)

(73) Assignee: Time Warner Cable, Inc., New York, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 12/389,724

(22) Filed: Feb. 20, 2009

(65) Prior Publication Data
US 2009/0254943 A1    Oct. 8, 2009

Related U.S. Application Data

(63) Continuation of application No. 11/057,749, filed on Feb. 14, 2005, now Pat. No. 7,509,663.

(51) Int. Cl.
*H04H 60/33* (2008.01)

(52) U.S. Cl. .......... 725/10; 725/9; 725/13; 725/14; 725/34; 725/46

(58) Field of Classification Search ............. 725/9, 10, 725/13, 14, 34, 46
See application file for complete search history.

(56) References Cited

U.S. PATENT DOCUMENTS

| | | | |
|---|---|---|---|
| 6,637,029 B1 | 10/2003 | Maissel et al. | |
| 2002/0188948 A1* | 12/2002 | Florence | 725/46 |
| 2003/0056216 A1 | 3/2003 | Wugofski et al. | |
| 2003/0084448 A1 | 5/2003 | Soundararajan | |
| 2005/0144499 A1* | 6/2005 | Narahara et al. | 714/1 |
| 2006/0064722 A1* | 3/2006 | Michel et al. | 725/47 |

* cited by examiner

*Primary Examiner* — Christopher Kelley
*Assistant Examiner* — Alazar Tilahun
(74) *Attorney, Agent, or Firm* — The Marbury Law Group, PLLC

(57) ABSTRACT

A favorites list of program channels which a cable TV user likely prefers is generated automatically from which the user may select a program channel to watch. Each program channel in the favorites list is identified based on a measure of the duration in which the program channel is continuously tuned to. In an embodiment, this measure varies nonlinearly with such a duration. The favorites list may further comprise sub-lists of program channels which may correspond to different periods of a day, week, etc. The favorites list may be generated from programs watched on multiple viewing devices.

28 Claims, 3 Drawing Sheets

| PROGRAM CHANNEL | 2 | 5 | 7 | 9 | ... |
|---|---|---|---|---|---|
| 6 AM – 12 PM | 1 | 0 | 2 | 23 | |
| 12 PM –6 PM | 4 | 10 | 3 | 2 | ... |
| 6 PM–12 AM | 3 | 20 | 1 | 0 | |
| 12 AM – 6 AM | 15 | 5 | 4 | 6 | ... |

| USER ACCOUNT ID | 1ST STT ADDRESS | 2ND STT ADDRESS | 3RD STT ADDRESS | ... |
|---|---|---|---|---|
| ACCOUNT1 | IP_ADDRESS11 | IP_ADDRESS12 | | ... |
| ACCOUNT2 | IP_ADDRESS21 | | | |
| ACCOUNT3 | IP_ADDRESS31 | IP_ADDRESS32 | IP_ADDRESS33 | ... |
| ACCOUNT4 | IP_ADDRESS41 | | | |

507

TECHNIQUE FOR IDENTIFYING FAVORITE PROGRAM CHANNELS FOR RECEIVING ENTERTAINMENT PROGRAMMING CONTENT OVER A COMMUNICATIONS NETWORK

RELATIONSHIP TO OTHER APPLICATIONS

This application is a continuation application of U.S. application Ser. No. 11/057,749, filed Feb. 14, 2005 now U.S. Pat. No. 7,509,663, which application is incorporated by reference for all purposes and from which priority is claimed.

FIELD OF THE INVENTION

The invention relates to communications systems and methods, and more particularly to a system and method for receiving entertainment programs through a communications network, e.g., a cable TV network.

BACKGROUND OF THE INVENTION

Use of a cable network to deliver programming content, e.g., TV programs, is ubiquitous. The cable network terminates on set-top boxes at the user premises. It is well known that the cable network also provides program guide data to the set-top boxes. The program guide data typically contains broadcast time and program channel information concerning the programs to be broadcast. The program guide data may be used to populate an interactive program guide (IPG) facilitating a user's access to desired programs on different program channels. After receiving the program guide data from the cable network, the set-top box stores it in a memory, which is updated from time to time.

Nowadays, the number of program channels providing programming content over a cable network is ever increasing. Cable users may feel overwhelmed by the vast number of channels offered. To alleviate this, a user may be allowed to program a set-top box on his/her own to assemble a set of channels as his/her favorite channels. Such a set may be accessed, e.g., by pressing a "Favorites (FAV)" key on a remote control, from which the user may select a channel by its identifier (e.g., its channel number) to watch.

Use of digital video recorders (DVRs), such as TiVo and ReplayTV devices, is also ubiquitous, which provide conveniences to TV viewers. For example, a prior art DVR allows a user to record his/her favorite TV programs for later review, and exercise a season-pass-like option to record every episode of his/her favorite program for a period. It may also predict what programs from different channels that the user may like by tracking the genre, actors, etc. of the programs previously selected by the user, and automatically record, and recommend to the user, the predicted programs for viewing.

SUMMARY OF THE INVENTION

The invention is premised upon a recognition that the set-up of a "favorites" list in prior art is cumbersome in that a user typically is required to go through menu items in order to add a given channel to the list. In addition, the favorite channels in the list remain unchanged until the user revises the list. Because of its static nature, the favorites list becomes outdated over time as it does not keep up with the user's changing viewing habit. To update the list each time the user has to go through the same cumbersome set-up procedure to change the channels therein.

The invention overcomes the prior art limitations by automatically updating the favorites list containing identifiers of a collection of program channels, which is a subset of the program channels accessible to a user. A particular program channel is included in the collection based at least on a measure of at least one duration in which the particular program channel has been selected to receive continuously programming content attributed thereto. In an embodiment of the invention, this measure is a nonlinear function of such a duration. For example, this measure may not be directly proportional to, and may not vary at the same rate as, such a duration.

In accordance with an aspect of the invention, the favorites list may comprise sublists of program channels corresponding to different periods of a day, week, etc., which may be updated independently.

BRIEF DESCRIPTION OF THE DRAWING

Further objects, features and advantages of the invention will become apparent from the following detailed description taken in conjunction with the accompanying drawing showing illustrative embodiments of the invention, in which.

DETAILED DESCRIPTION

The invention is directed to providing programming content to users through a broadband communications network, e.g., a cable network. Nowadays, a user may be overwhelmed by the ever-increasing number of program channels (also known as "services") providing programming content over the cable network. In prior art, a user may program a set-top terminal (STT) to set up a "favorites" list including identifiers of a set of program channels which the user prefers to watch. However, such a set-up is cumbersome in that the user typically is required to go through menu items in order to add a given channel to the list. The favorite channels in the list remain unchanged until the user revises the list. Because of its static nature, the favorites list becomes outdated over time as it does not keep up with the user's changing viewing habit. To update the list each time the user has to go through the same cumbersome set-up procedure to change the channels therein.

The invention overcomes the prior art limitations by automatically updating the favorites list based on statistics concerning the program channels that a user actually accessed. In accordance with the invention, the favorites list is dynamically and intelligently updated to include those channels that a user seems to watch "most often," as determined in a manner described below. The invention also is premised upon recognition that such favorite channels may vary with different periods of the day, perhaps due to the fact that different viewers may use the same set-top terminal to access program channels in those periods, respectively. Thus, in accordance with an aspect of the invention, channel usage may be tracked for separate daily viewing periods to take into consideration its viewer-dependency.

One typically considers the "most often" watched channels are those channels to which a user tunes and spends a long duration thereon each time. However, this measure would bias toward those channels which provide relatively long programs, e.g., a movie channel providing 90 minute or longer movies, and against those channels which provide relatively short programs, e.g., an MTV channel providing 3-5 minute music videos. As such, the measure strictly on the duration spent on a program channel may not accurately reflect the user's channel preferences.

In accordance with an embodiment of the invention, a modified duration measure is applied to gauge the user's channel preferences, which does not vary linearly with the duration that a user spends on a program channel. Rather, the modified duration measure affords a weight which varies inversely with the continuous duration that a user spends on a channel, and perhaps even no weight when such a duration exceeds a certain limit. In implementation, a timer is used to time the continuous duration spent on the currently viewed channel and causes a count to be incremented when the duration exceeds each milestone time length. In accordance with the modified duration measure, the milestone time lengths vary with the successive counts. For example, the milestone time lengths may follow a geometric progression, and the count may be incremented each time when the timer registers a milestone length which may be, e.g., twice as long as the previous milestone length. The count for a channel may be limited to an upper limit regardless of how much additional time the user continuously spends on the same channel after the maximum count is reached. The higher the cumulative count for a channel over a period of time is, the more "favorite" the channel presumed to be. In an illustrative embodiment, let's say each time when a user tunes to a program channel, the maximum count for the program channel is set to be 3, and the milestone lengths are 10, 20 and 40 minutes, respectively. That is, in this illustrative embodiment, if a user tunes to a movie channel 15 and continuously watches a movie that is 90 minutes long, the timer will cause the count for the movie channel to be incremented when the timer registers an initial 10 minute length (a first milestone length) into the movie, incremented again when it registers an additional 20 minute length (a second milestone length) into the movie, and incremented once again when it registers another 40 minute length (a third milestone length) into the movie. Thus, in accordance with the modified duration measure, the maximum count of 3 is garnered for the movie channel as soon as the first 70 minutes of the movie is reached. It should be noted that the modified duration measure in this instance gives no weight or significance to any view time after the first 70 minutes of the movie.

In contrast, a user who tunes to a sports channel to watch a football game and to a weather channel on every commercial break to monitor the latest storm, will cause the count for the sports channel to be incremented each time it is tuned in for at least 10 minutes. On the other hand, this behavior will most likely not change the count for the weather channel since the commercial breaks are usually shorter than 10 minutes.

In accordance with another aspect of the invention, when the count for a channel is increased by a certain value, the counts for all other channels are accordingly decreased by the same value, resulting in amplification of the count differentials, and at the same time better control of the range of the count values.

The invention is also premised upon the recognition that the manner in which a user tunes to a program channel may evidence a level of the user's familiarity with the channel, indicative of certain affinity therefor. For example, if the user directly keys a channel number on a remote control to access the channel, the user is presumed to have a significant level of familiarity with, and affinity for, the channel. In that case, in accordance with yet another aspect of the invention, bonus points may be added to the count for such a channel to take into account his/her affinity for the channel in the first place. The bonus points may be added to the count for the channel when the user continuously watches the channel for, say, at least 10 minutes (the first milestone length). In contrast, no bonus point is awarded if the user merely "surfs" to a channel presumably by chance.

Figure 1:
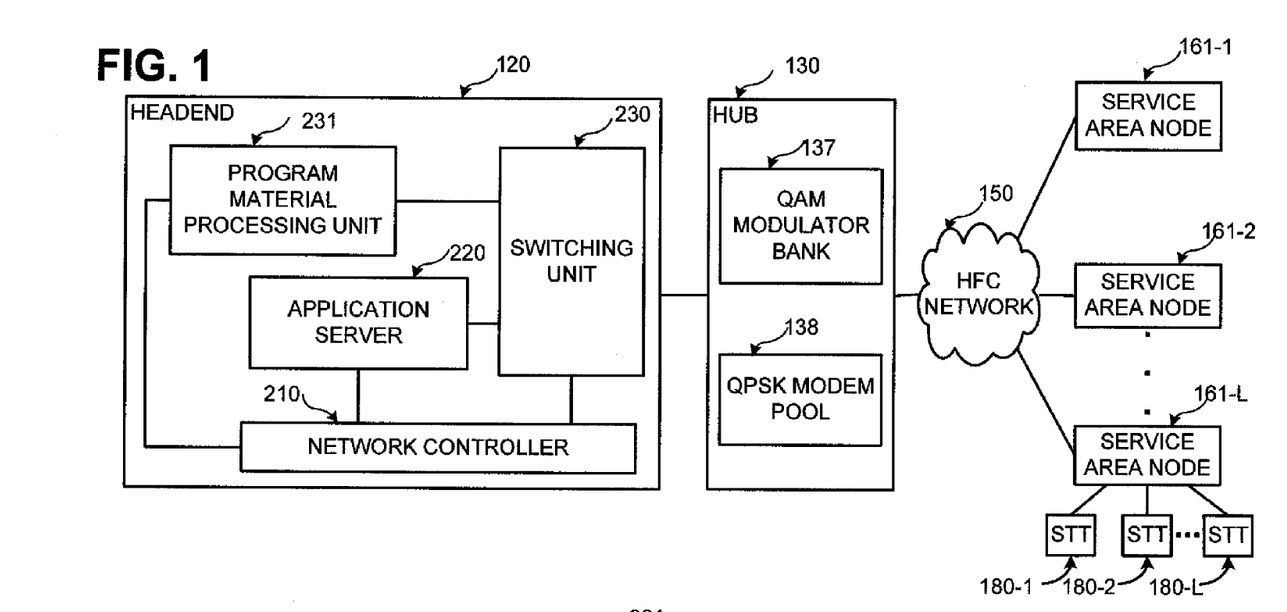
FIG. 1 is a block diagram of a broadband communications system in accordance with the invention.

FIG. 1 illustrates components of a broadband communications system 100, e.g., a cable system. Headend 120 receives incoming programming attributed to various program channels, and provides cable television services to STTs including STTs 180-1 through 180-L, where L represents an integer. It should be noted at this point that the term "program channel" should not be confused with "transmission channel." A "transmission channel" signifies a designated frequency band through which a transport stream containing broadcast programs and/or data is transmitted. A "program channel" signifies the source of program material or the service selected by a user to view. For example, a user may select program channel 2 to view a program channel provided by CBS, program channel 14 to view a program channel provided by ESPN, etc.

In a conventional manner, headend 120 broadcasts programming content downstream to STTs 180-1 through 180-L. Headend may also transmit to users data concerning system messages. Quadrature amplitude modulation (QAM) modulators and quaternary phase-shift keying (QPSK) modems in hub 130 modulate and format program streams and data received from headend 120 and transmit the modulated signals through network 150. In this instance, network 150 is a multi-channel delivery network comprises well-known hybrid fiber coaxial (HFC) cable network.

As shown in FIG. 1, one or more service area nodes (SANs), e.g., 161, function as an interface between the STTs and network 150. In particular, STTs 180 in a service area or neighborhood are connected through SAN 161 to network 150 and receive therefrom program broadcasts, as well as data, e.g., control information, emergency information, etc. Programming content is broadcast from headend 120 to the STTs through "in-band" transmission channels. These transmission channels may be 6 MHz bands populating a forward passband, e.g., 350-750 MHz band, of a coaxial cable, which is allocated for downstream communication from headend 120 to the STTs. QAM modulator bank 137 in hub 130 modulates the downstream communication onto selected in-band channels in accordance with a QAM scheme.

In addition to the in-band channels, downstream data may be communicated from headend 120 to the STTs via one or more forward data channels (FDCs). FDCs, sometimes referred to as "out-of band" channels, typically are used to transport data, e.g., system messages, to the STTs. The FDCs may occupy the 70-130 MHz band of a coaxial cable. QPSK modem pool 138 in hub 130 modulates downstream data onto selected FDCs in accordance with a QPSK scheme.

Upstream data is transmitted from the STTs to headend 120 via one or more reverse data channels (RDCs), which occupy a reverse passband, e.g., 5-40 MHz band, of a coaxial cable. Data carried in the reverse data channels is modulated in accordance with a QPSK scheme. Hub 130 receives the QPSK signals in the RDC and performs any necessary demodulation before transmitting the signals to headend 120.

The STTs may utilize a reverse data channel for sending application data, control messages, file requests, etc. Using a contention-based access mechanism established by the Digital Audio Visual Council (DAVIC), a standard setting organization, each STT can share an RDC with other STTs in the network. This mechanism enables an STT to transmit upstream messages without a dedicated connection to a QPSK demodulator. The mechanism also provides equal access to the STTs that share the RDC, and enables detection and recovery from reverse path collisions that occur when two or more of the STTs transmit an upstream message simultaneously. As also specified by DAVIC, for communications purposes, each STT and network controller 210 are identified by the Internet protocol (IP) addresses assigned thereto. However, these IP addresses may be randomly assigned each time the broadband communication system is reconfigured. As a result, the IP address of an STT or that of network controller 210 may change after a system reconfiguration. Nevertheless, each STT and network controller 210 is also assigned a media access control (MAC) address on a permanent basis, surviving any system reconfiguration.

Headend 120 includes program material processing unit 231, application server 220, network controller 210, and switching unit 230. In a well-known manner, program material processing unit 231 receives program materials from various sources attributed to different program channels, and processes the program materials to form individual program streams. Under control of network controller 210, the program streams are switched by switching unit 230 to appropriate modulators in QAM modulator bank 137 in hub 130, where the program streams are modulated onto the corresponding in-band transmission channels for broadcast to the STTs over network 150.

Application server 220 represents one or more server systems that provide software applications and services for STT users. For example, application server 220 may be a workstation comprising one or more software applications for providing database services, network management services, interactive program guide services, billing services, etc.

Figure 2:
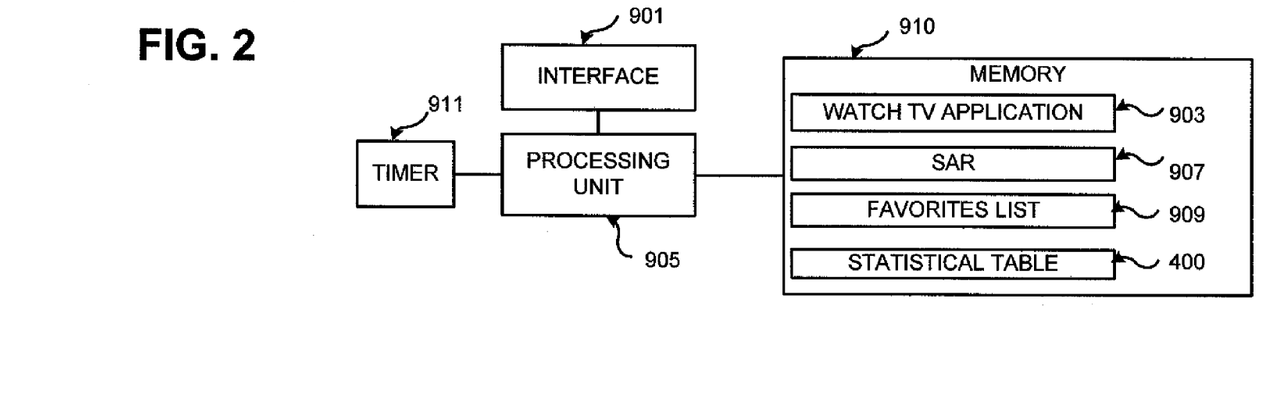
FIG. 2 is a block diagram of a set-top terminal in accordance with the invention.

FIG. 2 illustrates STT 900 representative of the STTs in this embodiment, which includes, among other things, interface 901 comprising a conventional cable modem for communications with headend 120 on the one hand, and conventional circuitry for receiving signals from a remote control on the other hand. A conventional "Watch TV" application denoted 903 is installed in STT 900 to service broadcast program channels. Watch TV application 903, residing in memory 910, provides such well known functions as channel navigation control, channel selection in response to a channel change event, etc. A channel change event occurs when a user at STT 900 issues a command to change from one program channel to another. Such a command may be issued, say, using a remote control (not shown), which signal is receptive by STT 900. Memory 910 in this instance comprises one or more caches, disks, hard drives, NVRAMs, DRAMs, Flash ROMs, and/or ROMs.

For example, in memory 910, NVRAM may be used for storage of a user's settings and set-top terminal configuration settings, such as parental control codes, a favorites list, set-top terminal setups, channel maps, authorization tables, and FDC address assignments. DRAM may be used for most application and operating system storage requirements, such as stacks, heaps, graphics, interactive program guide data, marketing data and usage data, and functions such as MPEG-2 video decompression, AC-3 audio decoding, and video manipulation. ROM may be used for storage of the operating system. Flash ROM may be used for storage of resident application software, as well as patches of the operating system and application software which are downloaded to STT 900 from headend 120 after STT 900 has been deployed at the user's premises.

Processing unit 905 orchestrates the operations of STT 900. It executes routines including, e.g., Watch TV application 903 and service application routine (SAR) 907 stored in memory 910. Instructed by SAR 907, unit 905, among other things, monitors channel change events, administer channel, service and other tables in STT 900, maintains favorites list 909 in accordance with the invention, etc.

Figure 3:
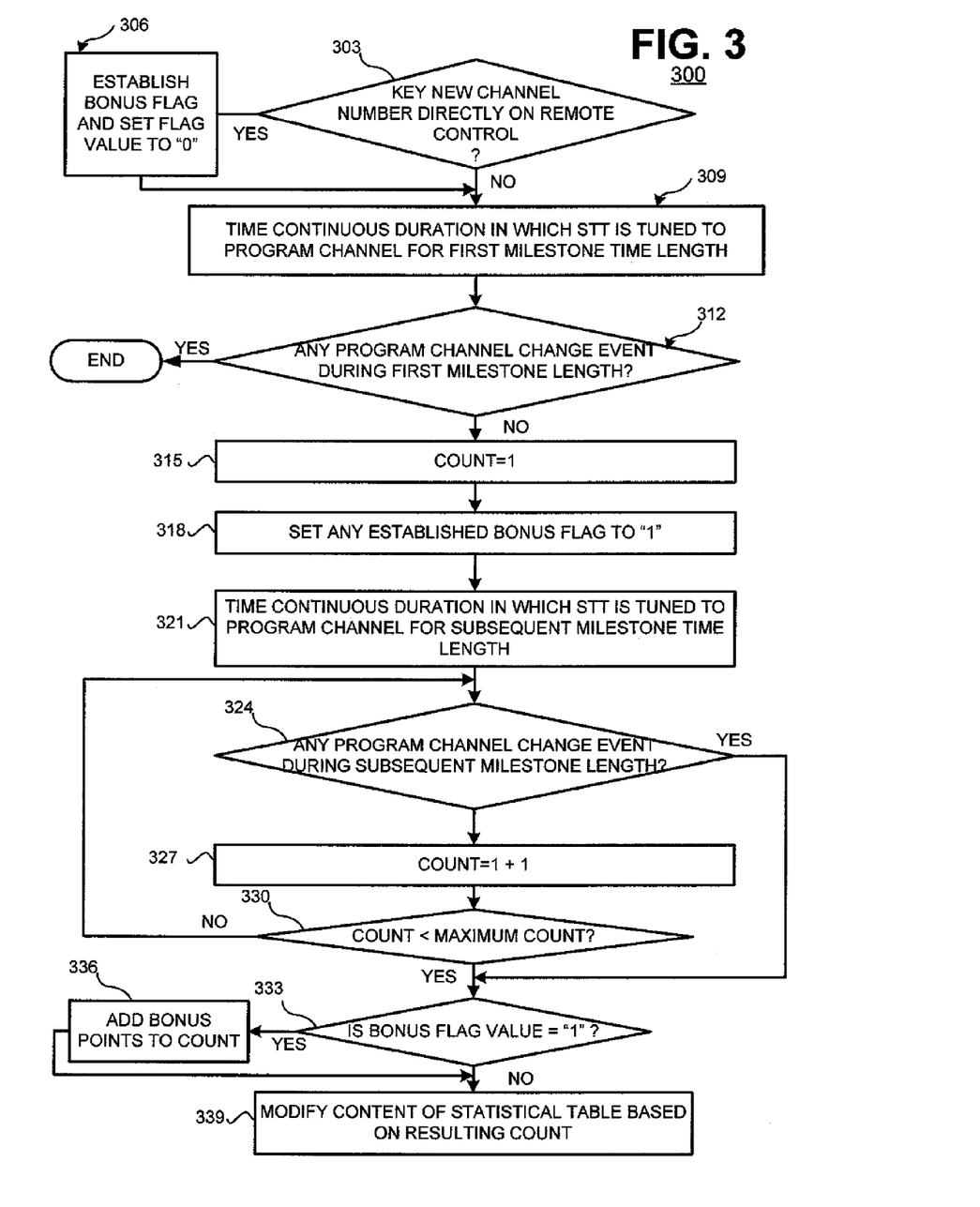
FIG. 3 is a flow chart depicting a process for generating a measure concerning the duration and the manner in which a set-top terminal is tuned to a program channel, in accordance with the invention.

FIG. 3 illustrates a subroutine (denoted 300) of SAR 907 for implementing the above-described modified duration measure to determine a user's "favorite" program channels in accordance with the invention. Subroutine 300 is invoked upon detection of a program channel change event in which a user tunes to, say, program channel 5 from another channel or from an "off" state of STT 900. At step 303, unit 905 determines whether the user access the new program channel, i.e., program channel 5, by keying the channel number, i.e., "5," directly on a remote control. If unit 905 determines that interface 901 received a signal from the remote control containing a specific channel number selection command as opposed to, say, containing a channel number increment command in a channel "surfing" scenario, unit 905 at step 306 establishes a bonus flag which is initially set to "0" and proceeds to step 309. Otherwise, unit 905 proceeds to step 309 directly where unit 905 sets timer 911 to time the continuous duration, in which STT 900 is tuned to program channel 5, for the first milestone time length, e.g., 10 minutes. During the milestone time length, unit 905 monitors for any channel change event, as indicated at step 312. Upon detection of a channel change event, subroutine 300 comes to an end. Otherwise, unit 905 proceeds to step 315 where unit 905 sets the count for the program channel in question to one. At step 318, unit 905 sets any bonus flag established at step 306 to "1." At step 321, unit 905 resets timer 911 to time the continuous duration, in which STT 900 is tuned to the same program channel, for a subsequent milestone time length, which in this instance is twice as long as the previous time length. During the subsequent milestone time length, unit 905 monitors for any channel change event, as indicated at step 324. Upon detection of a channel change event, subroutine 300 proceeds to step 333 described below. Otherwise, unit 905 at step 327 increments the count for the program channel in question by one. At step 330, unit 905 determines whether the count is smaller than or equal to a maximum count, which is three in this instance. If not, unit 905 returns to step 321. Otherwise, unit 905 proceeds to step 333 where it determines whether the bonus flag value equals "1." If so, unit 905 at step 336 adds bonus points (e.g., 2 in this instance) to the count value and proceeds to step 339. Otherwise, unit 905 directly proceeds to step 339 where it modifies the content of a statistical table based on the resulting count value for the program channel in question.

Figure 4:
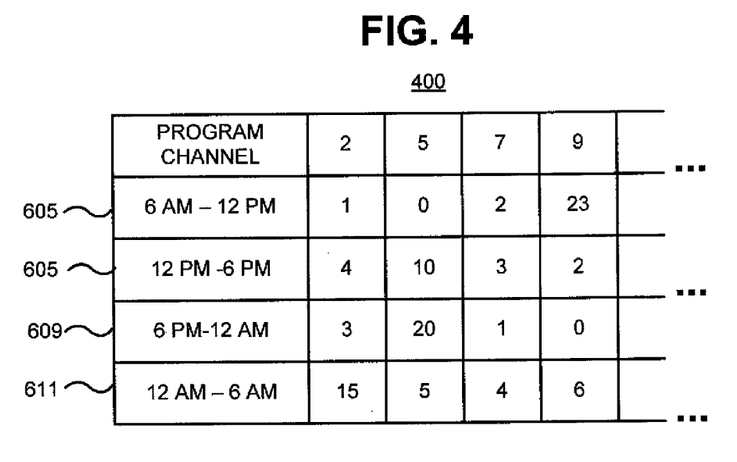
FIG. 4 illustrates a table for keeping track of cumulative measures for different program channels in accordance with the invention.

FIG. 4 illustrates the statistical table denoted 400 which is maintained in memory 910 for keeping track of cumulative count values for different program channels, respectively. As shown in FIG. 4, statistical table 400 includes columns corresponding to different program channels, e.g., program channels 2, 5, 7 . . . . It also includes four rows corresponding to different periods of a day (e.g., 6 am to 12 pm, 12 pm to 6 pm, 6 pm to 12 am, and 12 am to 6 am) to take into consideration any viewer dependency discussed before, i.e., possibly different viewers watching TV at the same STT in the different periods.

Referring also to FIG. 3, specifically at step 339 unit 905 consults a clock (not shown) in STT 900. Depending on the current time of the clock, unit 905 increases, by the count value resulting from subroutine 300, the cumulative count for the program channel in question in the appropriate row of table 400. By way of example, let's say the current time is 5 pm, and the count for the program channel in question, say, program channel 5, resulting from subroutine 300 is 3. In this example, unit 905 will increase the cumulative count value "110" for program channel 5 in row 607 corresponding to the period 12 pm to 6 pm by 3. At the same time, unit 905 will decrease the cumulative count values for all other program channels in row 607 by 3. Thus, for example, unit 905 will decrease the cumulative count value "4" for program channel 2 in row 607 by 3. Since in this instance a cumulative count value cannot be less than zero, for those other program channels in row 607 having cumulative count values of 3 or less (e.g., program channels 7 and 9), they will become zero.

In accordance with the invention, favorites list 909 is automatically updated from time to time, e.g., at a predetermined frequency. In this instance, favorites list 909 actually comprises four sublists corresponding to the four different time periods of a day (i.e., 6 am to 12 pm, 12 pm to 6 pm, 6 pm to 12 am, and 12 am to 6 am). In fact, the four favorites sublists may be updated independently, e.g., at different frequencies or times.

However, in this illustrative embodiment, the four sublists are updated automatically at the same time. When each favorites sublist is updated, unit 905 examines the corresponding row of table 400 and determines the K program channels having K highest cumulative count values in that row, where K represents an integer. As a result, after an update, a fresh first favorites sublist is realized which contains K "favorite" program channels for the 6 am to 12 pm period (corresponding to row 605), which are ordered with the most favorite program channel having the highest cumulative count value listed first;

a fresh second favorites sublist is realized which contains K "favorite" program channels for the 12 pm to 6 pm period (corresponding to row 607), which are ordered with the most favorite program channel having the highest cumulative count value listed first;

a fresh third favorites sublist is realized which contains K "favorite" program channels for the 6 pm to 12 am period (corresponding to row 609), which are ordered with the most favorite program channel having the highest cumulative count value listed first;

and a fresh fourth favorites sublist is realized which contains K "favorite" program channels for the 12 am to 6 am period (corresponding to row 611), which are ordered with the most favorite program channel having the highest cumulative count value listed first. In the event that two or more program channels in the same sublist have the same cumulative count value, their order in this instance is resolved according to the numeric order of their program channel numbers.

With the favorites sublists in place, when a user presses a "favorites (FAV)" key on a remote control associated with STT 900, unit 905 in response consults the clock to determine the current time. Unit 905 identifies the period of the day to which the current time belongs, and the sublist in list 909 associated with that period of the day. Unit 905 then selects the most favorite channel in the identified sublist, and tunes to the same. If the user continues to press the FAV key, say, within 60 seconds of the previous FAV key depression, unit 905 selects and tunes to the next most favorite channel in the sublist, and so on and so forth, thereby cycling through the favorite channels in the sublist. Otherwise, if depression of the FAV key is longer than 60 seconds of the previous FAV key depression, unit 905 jumps to the most favorite channel in the sublist.

A second embodiment of the invention will now be described, where the scenario in which multiple STTs in the same user location is contemplated. In one such user location, it is likely that the same user watches TV at a first STT, say, upstairs for a portion of the day followed by watching TV at a second STT downstairs for a separate or overlapping portion of the day. In this second embodiment, to more accurately reflect the user's channel preferences, application server 220 in headend 120 may be programmed to request the STTs in a user location to submit thereto cumulative count values in individual statistical tables 400 in the respective STTs, and generates a joint statistical table used by each STT in the user location. Such a joint statistical table may have the same format as table 400, and each count value in the joint statistical table is a function of the corresponding count values of the respective tables 400 in the STTs from the same user location. For example, the count value in the joint statistical table may be an average of the count values of the respective tables 400. Thus, in this second embodiment, processing unit 905 of each STT in a user location derives favorites list 909 from the count values in the joint statistical table in the same manner as individual statistical table 400 described in the previous embodiment. As a result, each STT in the same user location would have identical favorites list 909.

Figure 5:
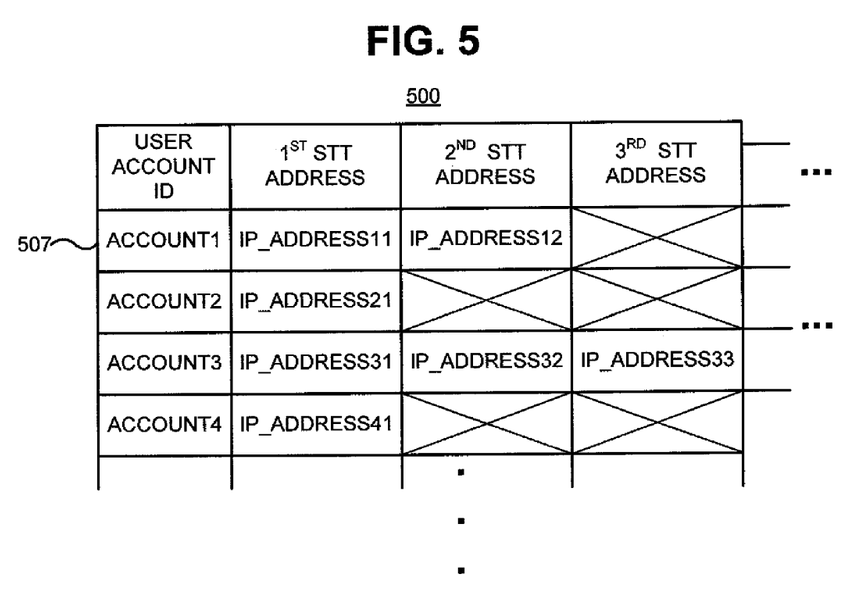
FIG. 5 illustrates a table for associating addresses of set-top terminals with different user accounts in accordance with an embodiment of the invention.

To implement the second embodiment, application server 220 utilizes user STT table 500 illustrated in FIG. 5, which a cable operator may already have been using for keeping track of STT installations at different user locations. As shown in FIG. 5, each row of table 500 contains IP (and/or MAC) addresses of the STTs associated with a user account ID which corresponds to a user location. For example, as indicated by row 507, account1 corresponding to a first user location is associated with two STTs installed therein whose addresses illustratively are IP_address11 and IP_address12, respectively.

From time to time, e.g., periodically, application server 220 goes through each user account in table 500, and sends a request (e.g., through an FDC) to the STTs in the user location corresponding to the user account, which are identified by their addresses in table 500. Such a request asks the recipient STTs to submit to server 220 copies of their respective tables 400. After collecting such copies from the STTs (e.g., through an RDC), application server 220 generates a joint statistical table described above, wherein each entry in this instance contains an average of the corresponding count values of the respective tables 400. The resulting joint statistical table is sent to each STT in the same user location, and is utilized by the STT to generate favorites list 909 in the same manner as individual statistical table 400 in the previous embodiment.

The foregoing merely illustrates the principles of the invention. It will thus be appreciated that those skilled in the art will be able to devise numerous other arrangements which embody the principles of the invention and are thus within its spirit and scope. For example, in an embodiment described above, favorites sublists are generated which correspond to different periods of a day. In another embodiment, favorites sublists are generated which may correspond to different days of a week. In that embodiment, for example, a first statistical table 400 is used to keep track of cumulative counts for program channels during weekdays (i.e., Monday through Friday), while a second statistical table 400 is used to keep track of cumulative counts for program channels during weekends (i.e., Saturday and Sunday). Such first and second statistical tables are then used for generating "weekday" and "weekend" favorites sublists, respectively. This is particularly advantageous in the case where a user's viewing habit varies substantially from weekday to weekend.

In addition, in the second embodiment described above, the joint statistical table is derived from individual statistical tables 400 from all STTs in a user location. However, in another embodiment, a user may designate a subset of the STTs in the user location which should contribute to the joint statistical table. Such a designation may be reflected in the user STT table 500 by associating only those STTs that the user designated with the user's account. As a result, the favorites sublists generated by the designated STTs are different and independent from those generated by the non-designated STTs in the same user location.

Further, in the disclosed embodiment, the network transport is illustratively realized using HFC cable network 150. However, other networks such as digital subscriber line (DSL) networks, ethernet networks and satellite networks may be used instead.

Finally, system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A system for updating a common list of user-preferred program channels comprising:
    a network;
    at least first and second set-top terminals (STTs) connected to the network, wherein the first STT comprises a first memory, a first timer and a first processing unit and wherein the second STT comprises a second memory, a second timer and a second processing unit;
    a common list of "k" user-preferred program channels stored in the first and second memories;
    a first channel table stored in the first memory, wherein the first channel table comprises a first list of viewed channels as selected by the first STT, wherein each viewed channel of the first list of viewed channels is associated with a first cumulative count value;
    a second channel table stored in the second memory, wherein the second channel table comprises a second list of viewed channels as selected by the second STT, wherein each viewed channel of the second list of viewed channels is associated with a second cumulative count value; and
    an application server connected to the network, wherein the application server executes instructions that cause the application server to:
        receive the first and second channel table from the first and second STTs;
        generate a common channel table from the first and second channel tables; and
        send the common channel table to the first and second STTs.
    wherein the first and second processing units execute instructions causing the first and second processing units to:
        select from the common channel table the "k" program channels having the highest cumulative count values; and
        update the common list of user-preferred program channels to reflect the selected "k" program channels.

2. The system of claim 1, wherein:
    the first and second processing units are configured with instructions that cause each processing unit to perform operations comprising:
        (a) detecting a first channel change event to establish the tuning of an STT to a viewed channel;
        (b) starting a timer to measure a first continuous duration of the STT tuned to the viewed channel;
        (c) detecting the occurrence of a second channel change event to establish the tuning of the STT away from the viewed channel before the first continuous duration reaches a first milestone duration;
        (d) when the first milestone duration is reached, then resetting the timer to zero and setting a count to 1;
        (e) starting the timer to measure a second continuous duration of the STT tuned to the viewed channel;
        (f) detecting the occurrence of a second channel change event to establish the tuning of the STT away from the viewed channel before the second continuous duration reaches a second milestone duration, wherein the second milestone duration is greater that the first milestone duration;
        (g) when the second milestone duration is not reached, then adding the count to the cumulative count value for the viewed channel;
        (h) when the second milestone duration is reached, then incrementing the counter for the viewed channel by 1 and then adding the count to the cumulative count value for the viewed channel, wherein,
    the first processing unit updates the first channel table, and the second processing unit updates the second channel table.

3. The system of claim 2, wherein the instructions further comprise instructions causing each processing unit to:
    prior to performing task (h), determine whether the count is greater than or equal to a count maximum; and
    when the count is greater than or equal to the count maximum, then leave the cumulative count value for the viewed channel unchanged.

4. The system of claim 2, wherein the instructions further comprise instructions causing each processing unit to:
    prior to performing task (b), determine whether the first channel change event was initiated by selection of the viewed channel by its channel number; and
    when the first channel change event was initiated by selection of the viewed channel by its channel number, then set a bonus flag to 0, and
    wherein task (d) further comprises when the first milestone duration is reached, then set the bonus flag to 1,
    wherein task (g) further comprises when the second milestone duration is not reached, then determine whether the bonus flag=1 and when the bonus flag=1, then add bonus points to the cumulative count for the viewed channel, and
    wherein task (h) further comprises when the second milestone duration is reached, then determine whether the bonus flag=1 and when the bonus flag=1, then add bonus points to the cumulative count for the viewed channel.

5. The system of claim 1, wherein prior to the first and second processing units executing the instructions, the common list of "k" user-preferred program channels stored in the first and second memories is initialized with no data.

6. The system of claim 1, wherein prior to the first and second processing units executing the instructions, the common list of "k" user-preferred program channels stored in the first and second memories is initialized with channel data selected from a list of user viewable channels.

7. The system of claim 1, wherein the first STT is configured to display the common list of "k" user-preferred program channels on a first display device in response to a command from a first control device.

8. The system of claim 1, wherein the second STT is configured to display the common list of "k" user-preferred program channels on a second display device in response to a command from a second control device.

9. The system of claim 2 wherein the first and second processing units are each configured with instructions that cause each processing unit to perform operations further comprising segregating the cumulative count for the viewed channels in the channel table into time periods and wherein the instruction for adding the count to the cumulative count value for the viewed channel comprises:
  determining a time;
  determining a time period in the channel table that encompasses the time; and
  adding the count to the cumulative count for the viewed channel within the time period.

10. The system of claim 9, wherein the common list of "k" user-preferred program channels comprises a time-based common list of "k" user-preferred program channels for each time period.

11. The system of claim 10, wherein the first STT is configured to display the time-based common list of "k" user-preferred program channels for a particular time period on a first display device in response to a command from a first control device.

12. The system of claim 10, wherein the second STT is configured to display the time-based common list of "k" user-preferred program channels for a particular time period on a second display device in response to a command from a second control device.

13. The system of claim 9, wherein the time periods comprise different time periods of a day.

14. The system of claim 9, wherein the time periods comprise different time periods of a week.

15. A method for updating a common list of user-preferred program channels comprising:
  storing in a first memory of a first set top terminal (STT) a common list of "k" user-preferred program channels and a first channel table, wherein the first channel table comprises a list of channels viewed from the first STT and wherein each viewed channel is associated with a first cumulative count value;
  storing in a second memory of a second set top terminal (STT) a common list of "k" user-preferred program channels and a second channel table, and the second channel table comprises a list of channels viewed from the second STT, wherein each viewed channel is associated with a second cumulative count value;
  sending the first and second channel tables to an application server;
  generating at the application server a common channel table from the first and second channel tables; and
  sending the common channel table to the first and second STTs.

16. The method of claim 15, wherein:
the first STT comprises a first processing unit;
the second STT comprises a second processing unit; and
wherein the method further comprises executing instructions in each of the first and second processing units to cause each processing unit to:

(a) detect a first channel change event to establish the tuning of an STT to a viewed channel;
(b) start a timer to measure a first continuous duration of the STT tuned to the viewed channel;
(c) detect the occurrence of a second channel change event to establish the tuning of the STT away from the viewed channel before the first continuous duration reaches a first milestone duration;
(d) when the first milestone duration is reached, then reset the timer to zero and set a count to 1;
(e) start the timer to measure a second continuous duration of the STT tuned to the viewed channel;
(f) detect the occurrence of a second channel change event to establish the tuning of the STT away from the viewed channel before the second continuous duration reaches a second milestone duration, wherein the second milestone duration is greater that the first milestone duration;
(g) when the second milestone duration is not reached, then add the count to the cumulative count value for the viewed channel;
(h) when the second milestone duration is reached, then increment the counter for the viewed channel by 1 and then add the count to the cumulative count value for the viewed channel; and
updating the first channel table using the first processing unit of the first STT; and
updating the second channel table using the second processing unit of the first STT.

17. The method of claim 16 further comprising executing instructions in each of the first and second processing units to cause each processing unit to:
  prior to performing task (h), determine whether the count is greater than or equal to a count maximum; and
  when the count is greater than or equal to the count maximum, then leave the cumulative count value for the viewed channel unchanged.

18. The method of claim 16 further comprising executing instructions in each of the first and second processing units to cause each processing unit to:
  prior to performing task (b), determine whether the first channel change event was initiated by selection of the viewed channel by its channel number; and
  when the first channel change event was initiated by selection of the viewed channel by its channel number, then set a bonus flag to 0, and
  wherein task (d) further comprises when the first milestone duration is reached, then set the bonus flag to 1,
  wherein task (g) further comprises when the second milestone duration is not reached, then determine whether the bonus flag=1 and when the bonus flag=1, then add bonus points to the cumulative count for the viewed channel, and
  wherein task (h) further comprises when the second milestone duration is reached, then determine whether the bonus flag=1 and when the bonus flag=1, then add bonus points to the cumulative count for the viewed channel.

19. The method of claim 15 further comprising, prior to updating the common list of "k" user-preferred program channels, initializing the common list of "k" user-preferred program channels stored in the first and second memories with no data.

20. The system of claim 15, wherein prior to updating the common list of "k" user-preferred program channels, initializing the common list of "k" user-preferred program channels stored in the first and second memories with channel data selected from a list of user viewable channels.

21. The method of claim 15 further comprising:
displaying the common list of user-preferred program channels on a first display device connected to the first STT in response to a command from a first control device.

22. The method of claim 15 further comprising:
displaying the common list of user-preferred program channels on a second display device connected to the second STT in response to a command from a second control device.

23. The method of claim 15 further comprising executing instructions in each of the first and second processing units to cause each processing unit to segregate the cumulative count for the viewed channels in the channel table into time periods and wherein adding the count to the cumulative count value for the viewed channel comprises:
determining a time;
determining a time period in the channel table that encompasses the time;
and adding the count to the cumulative count for the viewed channel within the time period.

24. The system of method 23, wherein the common list of "k" user-preferred program channels comprises a time-based common list of "k" user-preferred program channels for each time period.

25. The method of claim 24 further comprising displaying the time-based common list of "k" user-preferred program channels for a particular time period on a first display device in response to a command from a first control device.

26. The method of claim 24 further comprising displaying the time-based common list of "k" user-preferred program channels for a particular time period on a second display device in response to a command from a second control device.

27. The method of claim 23, wherein the time periods comprise different time periods of a day.

28. The method of claim 23, wherein the time periods comprise different time periods of a week.

* * * * *